(12) United States Patent
Certain

(10) Patent No.: US 11,748,328 B1
(45) Date of Patent: Sep. 5, 2023

(54) DISTRIBUTED DATABASE TRANSACTION VALIDATION

(71) Applicant: Amazon Technologies, Inc., Seattle, WA (US)

(72) Inventor: Tate Andrew Certain, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/714,535

(22) Filed: Dec. 13, 2019

(51) Int. Cl.
*G06F 17/00* (2019.01)
*G06F 16/23* (2019.01)
*G06F 16/22* (2019.01)

(52) U.S. Cl.
CPC ........ *G06F 16/2343* (2019.01); *G06F 16/2255* (2019.01); *G06F 16/2365* (2019.01)

(58) Field of Classification Search
CPC .............. G06F 21/10; G06F 2221/2135; G06F 2211/007; G06F 2221/2107; G06F 2221/0708; G06F 2221/0737; G06F 3/00; G06F 16/958; G06F 21/645; G06F 2209/463; G06F 3/048; G06F 9/46; G06F 9/465; G06F 9/541; G06F 21/32; G06F 21/602; G06F 9/453; G06F 21/34; G06F 21/72; G06F 21/73; G06F 21/86; H04L 63/12; H04L 9/3247; H04L 9/50; H04L 63/10; H04L 9/006; H04L 9/0891; G06F 16/2365; G06F 16/2358; G06F 16/2379; G06F 16/27; G06F 16/1865; G06F 11/1461; G06F 11/1471; G06F 11/2097; G06F 11/3688; G06F 16/2246; G06F 16/1805; G06F 16/245; G06F 16/24534; G06F 16/2454; G06F 16/275; G06F 16/955; G06F 2201/80; G06F 2201/87; H04L 2209/56; H04L 9/3236; H04L 9/3239; H04L 9/3297; G06F 16/24; G06F 21/44; G06F 21/445; G06F 21/64; G06F 40/109

See application file for complete search history.

(56) References Cited

U.S. PATENT DOCUMENTS

| | | | | |
|---|---|---|---|---|
| 7,689,832 | B2* | 3/2010 | Talmor et al. ........ | H04L 9/3249 713/186 |
| 10,803,537 | B2* | 10/2020 | Brown et al. ........ | G06Q 20/401 |
| 2020/0064783 | A1* | 2/2020 | Tran et al. ............. | E03B 7/071 |
| 2020/0250676 | A1* | 8/2020 | Sierra et al. .......... | H04L 9/302 |

* cited by examiner

*Primary Examiner* — Shyue Jiunn Hwa
(74) *Attorney, Agent, or Firm* — Davis Wright Tremaine LLP

(57) ABSTRACT

A distributed database receives a first command and second command sent by a client for processing in the context of a transaction. The distributed database validates the transaction by computing a digest based on signatures of the first and second commands, and comparing the computed digest to a digest received from the client. The transaction is committed upon validation.

20 Claims, 9 Drawing Sheets

DISTRIBUTED DATABASE TRANSACTION VALIDATION

BACKGROUND

Distributed database management systems are increasingly being called upon to provide reliable and secure capabilities for storing and retrieving data. One aspect of providing these capabilities is support for database transactions. A database transaction may include a number of related operations which are either successfully executed, or which have no effect if any one of the operations fails. However, providing support for transactions by distributed database management systems remains challenging.

BRIEF DESCRIPTION OF THE DRAWINGS

Various techniques will be described with reference to the drawings, in which.

DETAILED DESCRIPTION

In an example embodiment, a distributed database system receives commands to be executed in the context of a transaction. The commands are transmitted separately, and due to various reasons the commands may be received out of order, or not received at all. If not detected, these events compromise the integrity of the transaction. To detect such instances, and to verify the integrity of the transaction, the distributed database system computes a digest of the transaction based on the respective signatures of each command received by the database, according to the order in which the commands was received. This computed digest is compared to another digest, computed independently by the client driving the transaction. If the computed digest is equal to the digest received from the client, the transaction may be committed. Otherwise, the transaction may be rolled back.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

As one skilled in the art will appreciate in light of this disclosure, certain embodiments may be capable of achieving certain advantages, including those related to the storage and retrieval of configuration information. In particular, the technical field of computing configuration management is improved by the provision of techniques, embodiments of which are described herein, for indexing configuration data and facilitating the efficient retrieval of configuration data.

Figure 1:
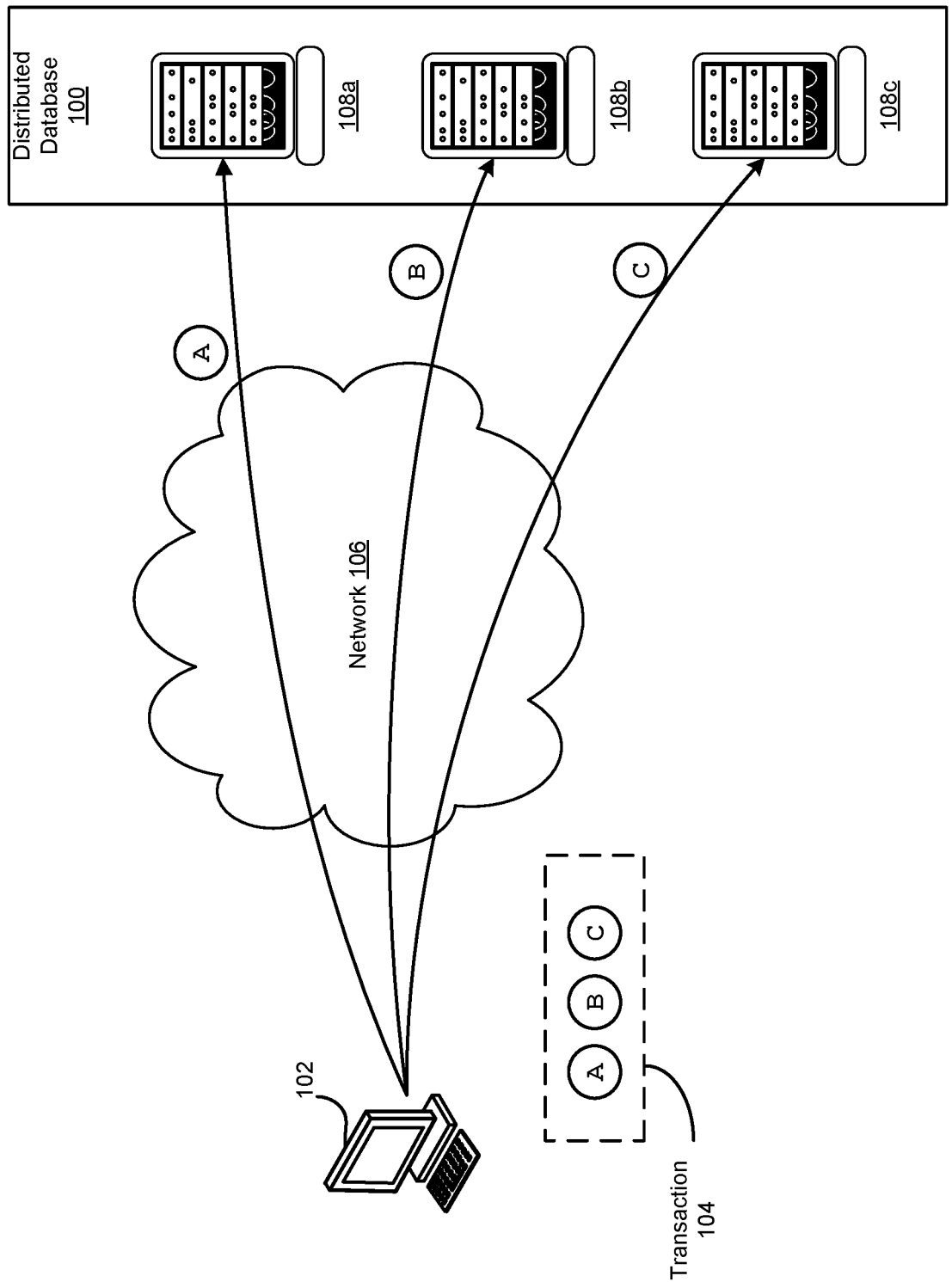
FIG. 1 illustrates an example of a distributed database, in accordance with at least one embodiment.

FIG. 1 illustrates an example of a distributed database, in accordance with at least one embodiment. In the example of FIG. 1, a distributed database 100 receives and processes a transaction 104 originating from a client 102.

A distributed database 100, in at least one embodiment, comprises a plurality of nodes 108a-c. Collectively, the nodes 108a-c of the distributed database 100 manage a collection of data. Examples of collections which may be maintained, in various embodiment, by distributed database 100 include collections of name-value or name-item pairs, relational and non-relational tables, collections of documents, and so forth.

The nodes 108a-c of the distributed database may each manage a partition, or portion, of the collection of data. For example, a table or collection of name-value pairs might be divided into partitions, and each of the nodes 108a-c might maintain a portion of the collection. The nodes 108a-c, in at least one embodiment, each correspond to a server or other computing device with at least one processor and a memory to store processor-executable instructions. The nodes 108a-c also may comprise one or more storage devices, on which the nodes 108a-c maintain their respective portions of the collections of data.

In at least one embodiment, the distributed database 100 is a relational database.

In at least one embodiment, the distributed database 100 is a non-relational database, such as a "NoSQL" or key-to-value database.

In at least one embodiment, the distributed database 100 is a journaled database. A journaled database management system refers to a database system which maintain journal structure that store an immutable history of transactions performed on a collection of data maintained by the system.

In at least one embodiment, commands received by the distributed database 100 are performed in the order the commands are received by the database 100. This may be true even in cases where the commands are order-dependent. Although such cases may be rare, they may result in data being lost or corrupted. As such, the client 102 and distributed database 100 employ techniques described herein to detect such occurrences, and to ensure that no transaction in which commands were executed out-of-order is allowed to commit.

A client 102 may comprise a computing device with at least one processor and a memory to store processor-executable instructions. Examples of such computing devices include, but are not limited to, personal computers, smartphones, tables, internet-of-things devices, and so forth.

A client 102 may send, to the distributed database 100, a request to perform a transaction 104 comprising commands A, B, and C. These commands may be sent separately, via network 106, to the nodes 108a-c of the distributed database.

A network 106 may comprise any of a variety of networking and communications technologies, potentially including but not limited to those based on internet protocol ("IP") and transmission control protocol ("TCP"), Ethernet, the Internet, and so forth.

A transaction, in at least one embodiment, refers to one or more operations to be performed atomically on the collection of data maintained by the distributed database 100.

Here, atomically refers to a property of the transaction in which either all commands in the transaction either all being successfully performed, or the transaction having no effect.

The transaction, in at least one embodiment, is a distributed transaction. This refers to the transaction being performed on more than one computing device, such as more than one of the nodes 108a-c. In the example of FIG. 1, the transaction 104 comprises commands A, B, and C. These three commands are executed, respectively, on one of the three nodes 108a-c of the distributed database 100. They are executed atomically in the context of the transaction 104. As such, either each of commands A, B, and C will be executed, or the transaction 104 will have no effect on the collection of data maintained by the distributed database 100. Moreover, the order in which the commands A, B, and C are executed is guaranteed, so that each command is executed in the intended order of A, then B, and then C.

However, it may be a property of network 106, or a consequence of some other factor, that commands A, B, and C might not be received by the distributed database 100 in that intended order. For example, the distributed database 100 might receive A, then C, and then B. This might cause commands B and C to behave unpredictably. It might also be the case that not all of the commands are received. For example, the distributed database 100 might receive commands A and C, but not command B. In cases such as these, the transaction should not be committed since the guarantee of atomicity would not be assured.

A command, in at least one embodiment, comprises a request to modify the state of a collection of data maintained by the distributed database 100. For example, a command might request that a row of a table be inserted, updated, or deleted, or that a document or item be inserted. It will be appreciated that these examples are intended to be illustrative rather than limiting, and as such should not be construed in a manner which would limit the scope of the present disclosure to only those embodiments which include the specific examples provided.

In at least one embodiment, a command comprises a query language definition of the operation that is to be performed by execution of the command. For example, a command may be represented as a structured query language ("SQL") statement. It will be appreciated that this example is intended to be illustrative rather than limiting, and as such should not be construed in a manner which would limit the scope of the present disclosure to only those embodiments which include the specific examples provided. Commands may also comprise binary or non-language-based representations, such as commands transmitted via a protocol such as representational state transfer ("REST"), or via a standardized or proprietary protocol for database interaction.

The distributed database 100 may receive the commands A, B, and C of the transaction 104 and make a determination to either commit or roll back the transaction 104. If the distributed database 100 determines to commit the transaction, the transaction ends and the effects of performing the commands A, B, and C are made durable. If the distributed database 100 determines to roll back the transaction, the transaction ends without having any effect.

In at least one embodiment, the distributed database 100 determines to commit or roll back the transaction based on a validation process which verifies that each and every command issued by the client 102 is received by the distributed database 104, and that the order of the commands indicated to the server are the same as the order of the commands intended by the client. For example, the server might infer that the commands should be executed in the order in which they were received. However, if delays in network 106 cause a command to be received out of order, this inference is not correct. The validation may also include determining that no additional commands are included, such as those that might occur from inadvertent duplication of a message or by a malicious party issuing an unauthorized command.

In at least one embodiment, the distributed database 100 validates the transaction by comparing a digest hash computed by the client 102 with a digest hash computed independently by the distributed database 100. On the client, the digest hash is computed based on each of the commands intended to be included in the transaction, and on the order those commands are intended to be executed. The computation of the digest hash is such that any change to the commands or their order would also cause a change to the digest hash. The distributed database 100 computes the digest hash in the same way, but based on the commands actually received and on an indicated order. Here, indicated order refers to an order implied or specified by any of various factors or information, such as the order in which the commands were received, or information sent with the commands to indicate the intended order of the commands. Any change to the received commands, or to the order of the commands as determined by the distributed database 100, will cause a corresponding change to the digest hash computed by the distributed database 100. The distributed database can therefore validate the transaction based, at least in part, on a comparison of the digest hash computed by the client 102 with the digest hash computed by the distribute database 100.

Figure 2:
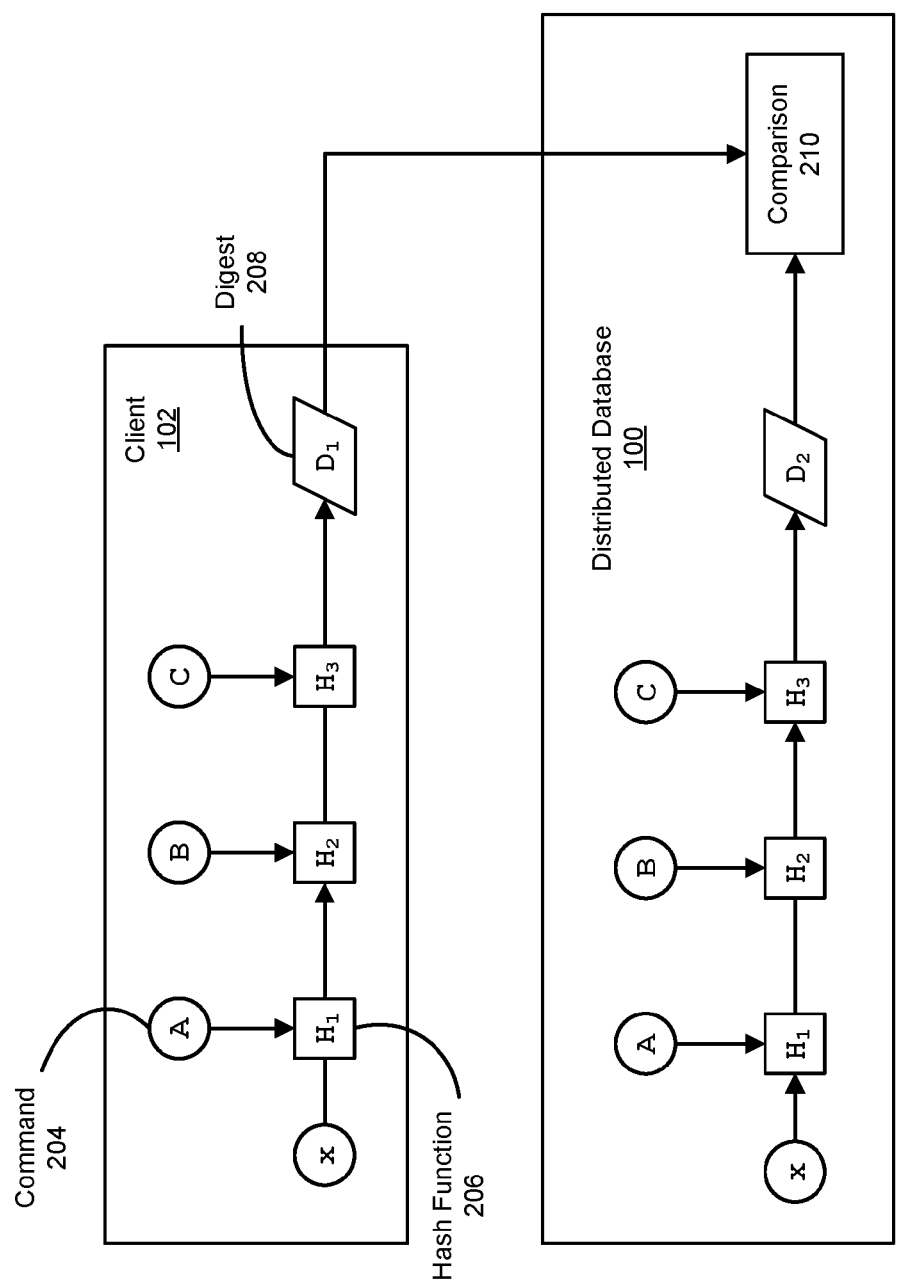
FIG. 2 illustrates an example of transaction validation, in accordance with at least one embodiment.

Validation of a transaction may be further understood in view of FIG. 2, which illustrates an example of transaction validation, in accordance with at least one embodiment. In the example 200 of FIG. 2, distributed database 100 is validating a transaction which, for illustrative purposes, is presumed to correspond to the transaction 104 depicted in FIG. 1.

In at least one embodiment, the client's computation of a digest 208 $D_1$ is based on successive application of a hash function 206. The computation of the digest $D_1$ proceeds by first computing a hash value based on a seed value X and a signature of command A 204. The output of Hi and a signature of command B are then used to compute $H_2$, and the output of $H_2$ and a signature of command C are, in turn, used to compute $H_3$.

A hash function, as used herein, refers to software instructions executed by a computer processor, or circuitry, for computing a hash value from one or more inputs. A cryptographic hash function may be referred to herein as a hash function. A hash value may sometimes be described and may be referred to herein as a cryptographic signature, a signature, hash value, or as a hash. Example of hash functions which may be used include, but are not limited to, the secure hash algorithm ("SHA"), message digest ("MD") algorithms, and so forth.

In at least one embodiment, each of the hash functions 206 take two operands. One of these operands may be either a seed value or a prior output of the hash function 206. The other operand may be a value (such as a hash value) computed from a command and its parameters. This value may be described as a command signature. Calculation of such values is described in more detail herein, for example with respect to FIG. 4.

The distributed database 100, in at least one embodiment, computes a digest $D_2$ using the same technique. A comparison function 210 of the distributed database 100 may then compare $D_1$ with $D_2$ to determine if the transaction can be valid. If $D_1$ and $D_2$ are equal, the distributed database and the client have corresponding views of the transaction, which is to say that the distributed database has been provided with the correct commands and parameters of the transaction, and that the distributed database has the correct understanding of the order in which the commands should be performed.

Figure 3:
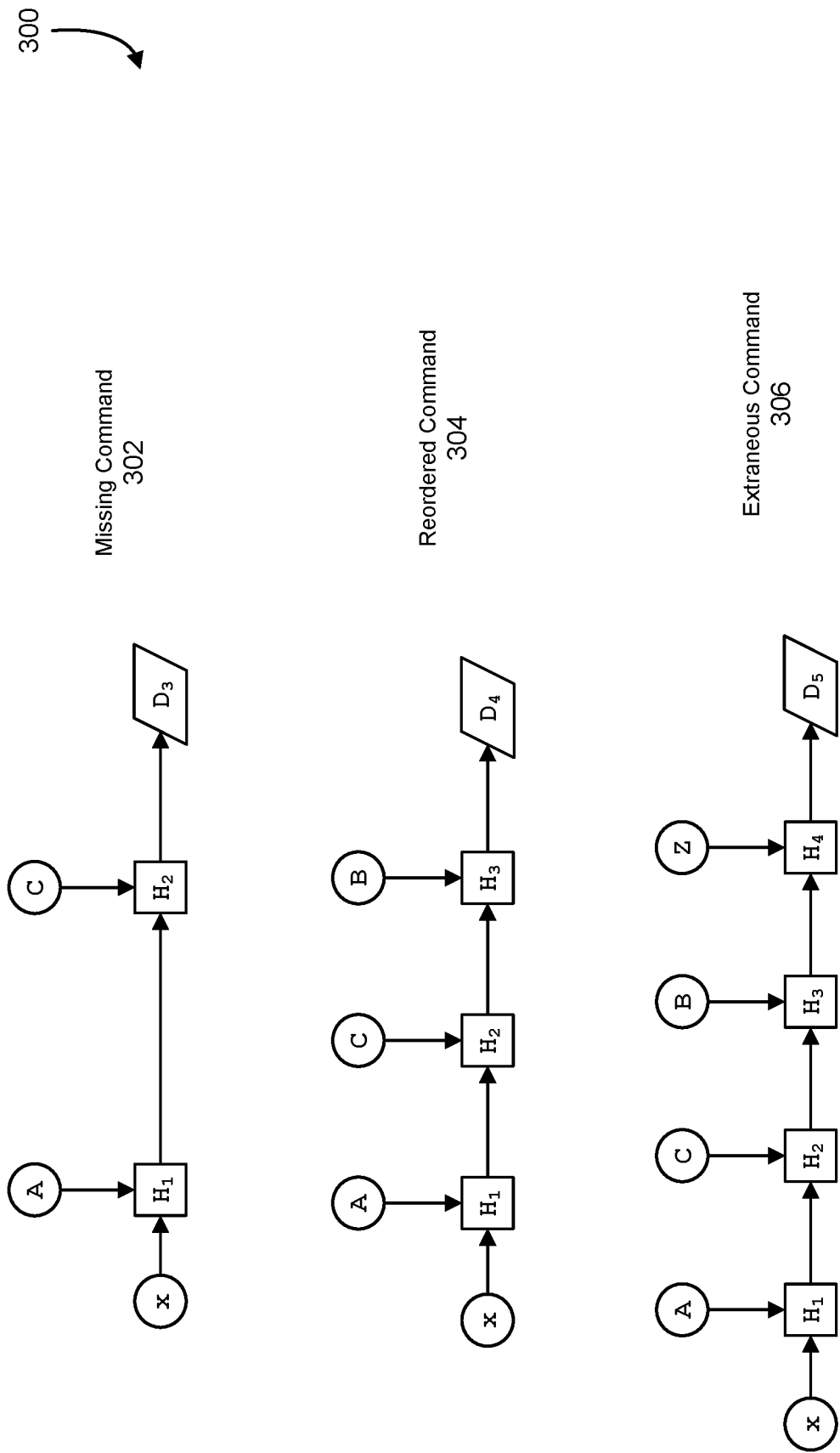
FIG. 3 illustrates an example of transactions failing validation, in accordance with at least one embodiment.

FIG. 3 illustrates examples 300 of transactions failing validation, in accordance with at least one embodiment. In an example of a missing command 302, a distributed database calculates a digest $D_3$ is based on command A and C, but not based on command B. This might happen when, for example, the client's request to perform command B fails to reach the distributed database due to a transmission error. The resulting digest $D_3$ would not match the digest $D_1$ computed by the client, and the transaction would not be validated.

In another example, a reordered command 304 might occur when the distributed database perceives the order of commands to be different from the order intended by the client. This might occur, for example, when the client's requests to perform the commands are received by the distributed database in an order other than the order they were sent by the client. The resulting digest value $D_4$ would be different from the digest value $D_1$ calculated by the client, since the digest calculation is order-dependent.

In some cases and embodiments, it might be possible for an extraneous command 306 to be received by the distributed database. For example, a request to perform a command might be duplicated in transit, so that the distributed database receives two copies of the command. Another possibility is that a malicious party is somehow able to "spoof" a command. Here too, the resulting digest $D_5$ would be different than the client's digest $D_1$, since the digest would reflect the inclusion of the additional command Z, as depicted in FIG. 3.

Figure 4:
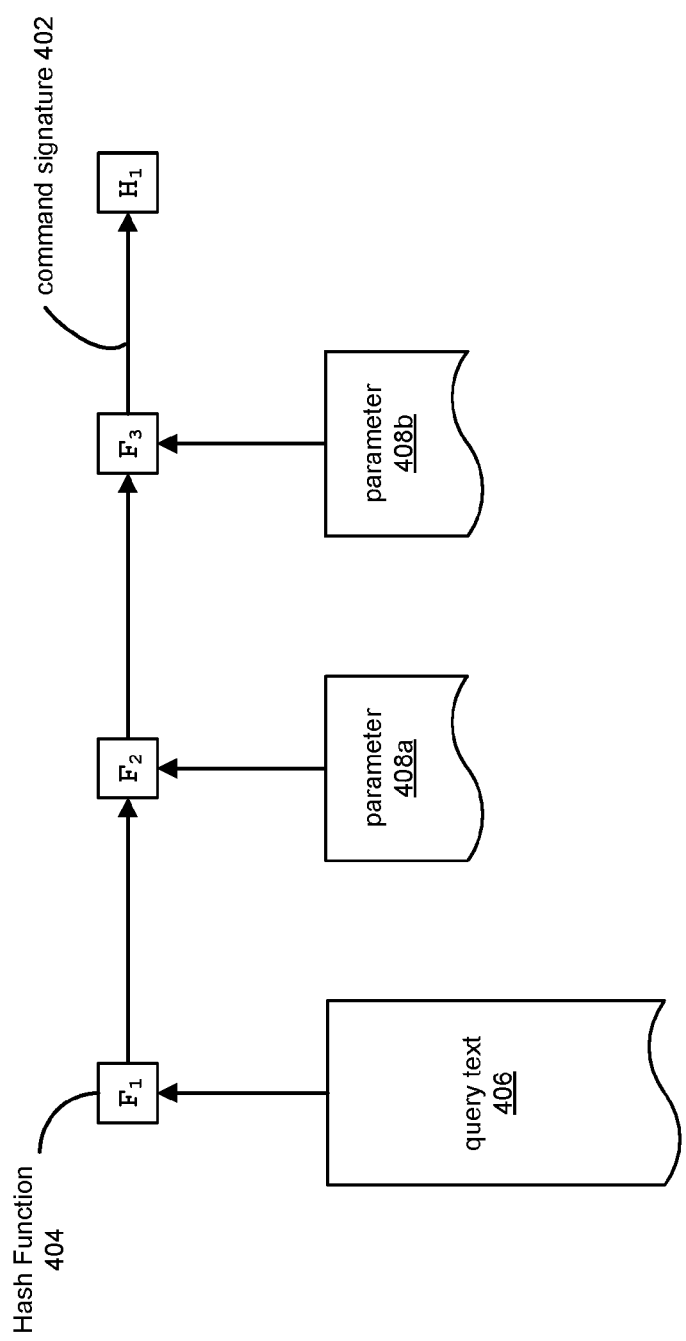
FIG. 4 illustrates an example of computing a command signature, in accordance with at least one embodiment.

FIG. 4 illustrates an example 400 of computing a command signature, in accordance with at least one embodiment. The computed command signature 402, for the illustrative purposes of this example, is for the command A that is input to the hash function $H_1$ that is depicted in FIG. 2, though the same technique might be applied to calculate a command signature for any of the commands A, B, and C depicted in FIG. 2.

In at least one embodiment, the computed command signature 402 is based on a chained or serial application of a hash function to an ordered list of command components. In the example of FIG. 4, this list comprises query text 406 and parameters 408a,b. In at least one embodiment, the order of the parameters 408a,b corresponds to the order in which the parameters are referenced in the query text 406. However, any of a variety of orderings may be used, provided that the same ordering is used by both the client and the distributed database when computing their respective digest values.

As depicted in FIG. 4, in at least one embodiment, a function $F_1$ 404 is applied to the query text 406. The function $F_1$ may be a hash function, or other cryptographic function with properties similar to those of a hash function. A function $F_2$ is then applied to the output of $F_1$ and a first parameter 408a. A function $F_3$ is then applied, in turn, to the output of $F_2$ and a second parameter 408b. A result of this successive application of the functions is the command signature 402.

It will be appreciated that the example of calculating a command signature 402 that is provided in FIG. 4 is one of many possible implementations. As such, the provided example should not be construed in a manner which would limit the scope of the present disclosure to include only those embodiments which include the specific example provided. In general, the calculation of the command signature 402 is such that a change to the command or its parameters also results in a change to the signature. However, if the command and its parameters does not change, the same signature is produced.

In at least one embodiment, a command signature is generated by applying a cryptographic function, such as a hash function, to text which comprises the query text and concatenated textual representations of the command's parameters. The concatenation may be ordered correspond to the order in which the parameters are referenced in the query text, or according to another ordering scheme. The client and distributed database utilize the same scheme, and technique for calculating the command signature.

In at least one embodiment, a command signature is generated for a batch command. Here, a batch command refers to a command that is executed multiple times using multiple sets of parameters.

Figure 5:
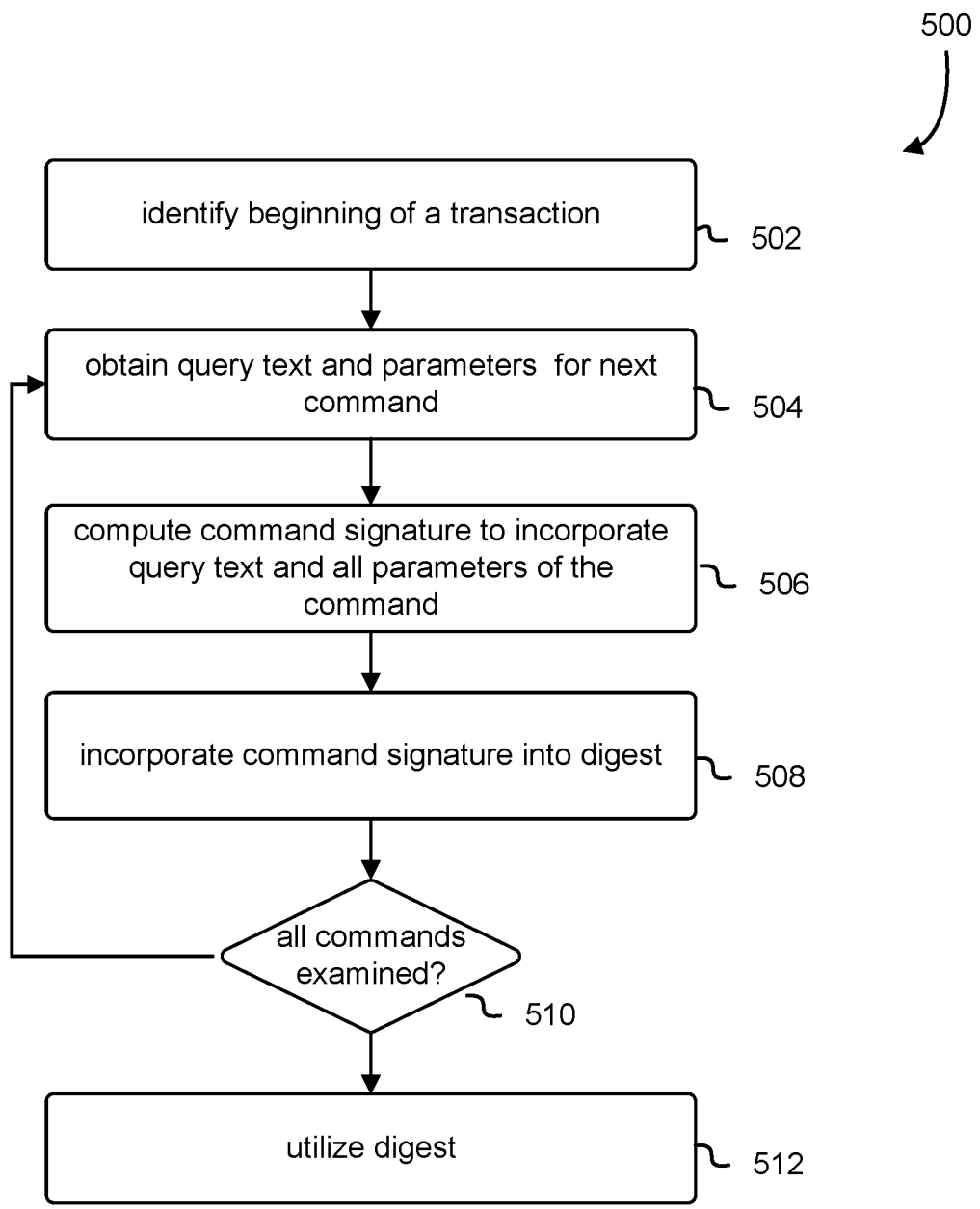
FIG. 5 illustrates an example process of computing a digest value, in accordance with at least one embodiment.

FIG. 5 illustrates an example process of computing a digest value, in accordance with at least one embodiment. The example process 500 may be performed by any suitable computing system or combination of systems, including for example the client computing device or the distributed database depicted in FIG. 9. An output of the depicted example process 500 is a digest of a transaction, which be sent by the client to the distributed database, so that the distributed database validate the transaction.

Although FIG. 5 is depicted as a series of steps or operations, the depicted sequence should not be viewed as limiting the scope of the present disclosure to only those embodiments that conform to the depicted sequence. For example, in various embodiments, the steps or operations depicted in FIG. 5 may be altered, reordered, or omitted, except where explicitly stated or where logically required, such as when an input to one step or operation is obtained from an output of another step or operation.

At 502, the beginning of a transaction is identified. This may be done, for example, by a client determining to initiate a transaction, or by a distributed database receiving a request to initiate a transaction.

At 504 the client or distributed database obtains query text and parameters for the next command in the transaction. This might be done, for example, each time a command is sent by the client to the distributed database. A client-side driver, for example, could respond to a request to send a command to the distributed database by obtaining and storing the command text and its parameters, and then computing and sending a digest computed according to the techniques of FIG. 5. Likewise, the distributed database might receive the command sent from the client-side driver, and store the command text and its parameters.

At 506, the client or distributed database computes a command signature so as to incorporate the query text and all of the parameters of the command. FIG. 4 provides an example of how a command signature may be calculated. The computation of the command signature is such that a change to the query text or any of the parameters also causes a change to the resulting command signature. However, for a given set of query text and any associated parameters, the output of the computation is determinate.

At 508, the client or distributed database incorporates the command signature into a command digest. Initially, the command signature may be combined with a seed value, and for subsequent iterations the digest from the previous iteration is used. In this way, the command signatures are incorporated into the digest in the same order as the commands are intended to be executed.

In at least one embodiment, incorporation of a command signature into a digest comprises applying a hash operator with two operands, one being the prior version of the digest or a seed value, and the other being the command signature. Other cryptographic functions, with properties similar to a hash function, may be used.

At 510, the client or distributed database determines whether or not all of the transaction's commands have been examined. If all commands have not yet been examined, the process repeats from 504, so that each command and its parameters are incorporated into the digest.

In at least one embodiment, the client determines that all commands have been sent when there is an indication that the transaction should be committed. For example, a client-side driver might receive an application programming interface ("API") call that requests that the transaction by finalized and committed. The client-side driver responds by determining that all commands associated with the transaction have been sent, and proceeds to send the digest of the transaction, at 512, to the distributed database. Likewise, in at least one embodiment, the distributed database may determine that all commands have been received when it receives, from the client-side driver, a request to commit the transaction. As noted, it may be the case that the server has not actually received all commands associated with the transaction. However, the request to commit the transaction serves as an indicator that the transaction should be validated by independently computing its own version of the digest and comparing it to the version sent by the client.

Figure 6:
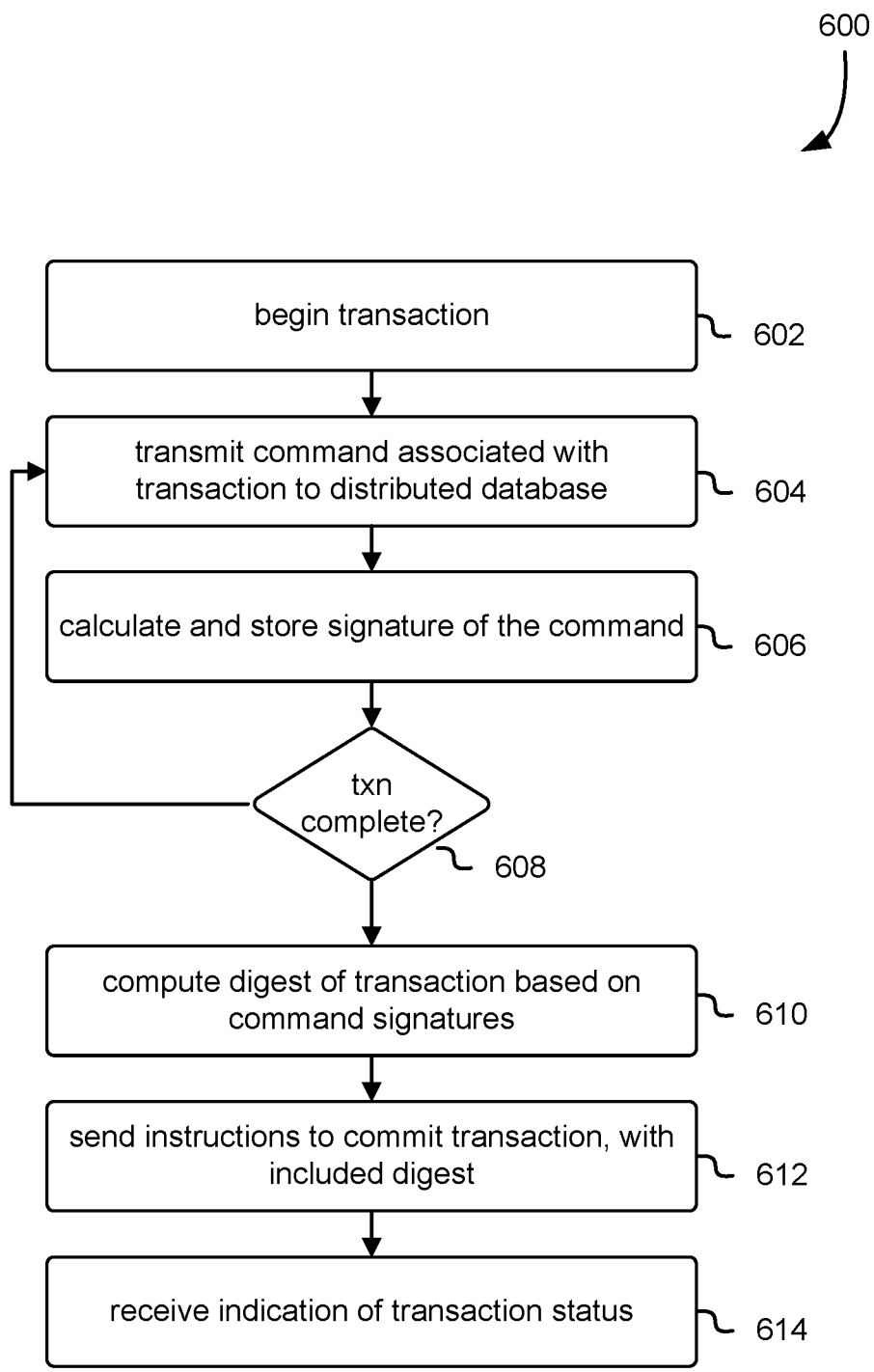
FIG. 6 illustrates an example of client-side processing of a transaction, in accordance with at least one embodiment.

FIG. 6 illustrates an example of client-side processing of a transaction, in accordance with at least one embodiment. The example process 600 may be performed by any suitable computing system or combination of systems, including for example the user device, web server, or application server depicted in FIG. 9.

Although FIG. 6 is depicted as a series of steps or operations, the depicted sequence should not be viewed as limiting the scope of the present disclosure to only those embodiments that conform to the depicted sequence. For example, in various embodiments, the steps or operations depicted in FIG. 6 may be altered, reordered, or omitted, except where explicitly stated or where logically required, such as when an input to one step or operation is obtained from an output of another step or operation.

At 602, the client begins a transaction. In at least one embodiment, a transaction is initiated when a client sends, to the distributed database, a command to initiate a local or distributed transaction. In at least one embodiment, this command is treated as the first command in the transaction with respect to generating a signature, and as such is incorporated into the transaction digest as the first command.

At 604, the client transmits a command associated with the transaction to the distributed database. The command may comprise query text, or a binary version thereof, and one or more parameters. In some cases, the command has no parameters, and consequently no parameters are included. The command may also include, or be accompanied by, data that identifies the transaction in which the command is to be executed.

At 606, the client calculates and stores the signature of the command that was transmitted. The command signature may be calculated, for example, using the techniques described with respect to FIG. 4. The command signature may be stored so that it is available for use in calculating the transaction digest. In at least one embodiment, the digest is updated immediately after calculating the command signature, and the updated transaction digest is stored, rather than the command signature.

At 608, the process repeats for each command send in association with the transaction. Otherwise, if the transaction is ready to be committed, the process continues to 610.

At 610, the client computes a digest of the transaction based on the signatures of the commands that were associated with the transaction. In at least one embodiment, the transaction digest is updated when each command is sent, and is finalized at operation 610.

At 612, the client sends instructions to commit the transaction, and includes a copy of the transaction digest. If the distributed database has received each of the commands sent by the distributed database, along with their associated parameters, and the order of the commands as understood by the distributed database matches the intended order, the digest computed by the digest should match the digest computed independently by the distributed database. If there are discrepancies in the commands, parameters, or order of execution, the digests should not match.

At 614, the client receives an indication of the transaction's status. If the digest sent to the distributed database matches a corresponding version of the digest computed by the distributed database, the transaction is validated and may be committed. If the digests do not match, the validation fails and the transaction is rolled back.

Figure 7:
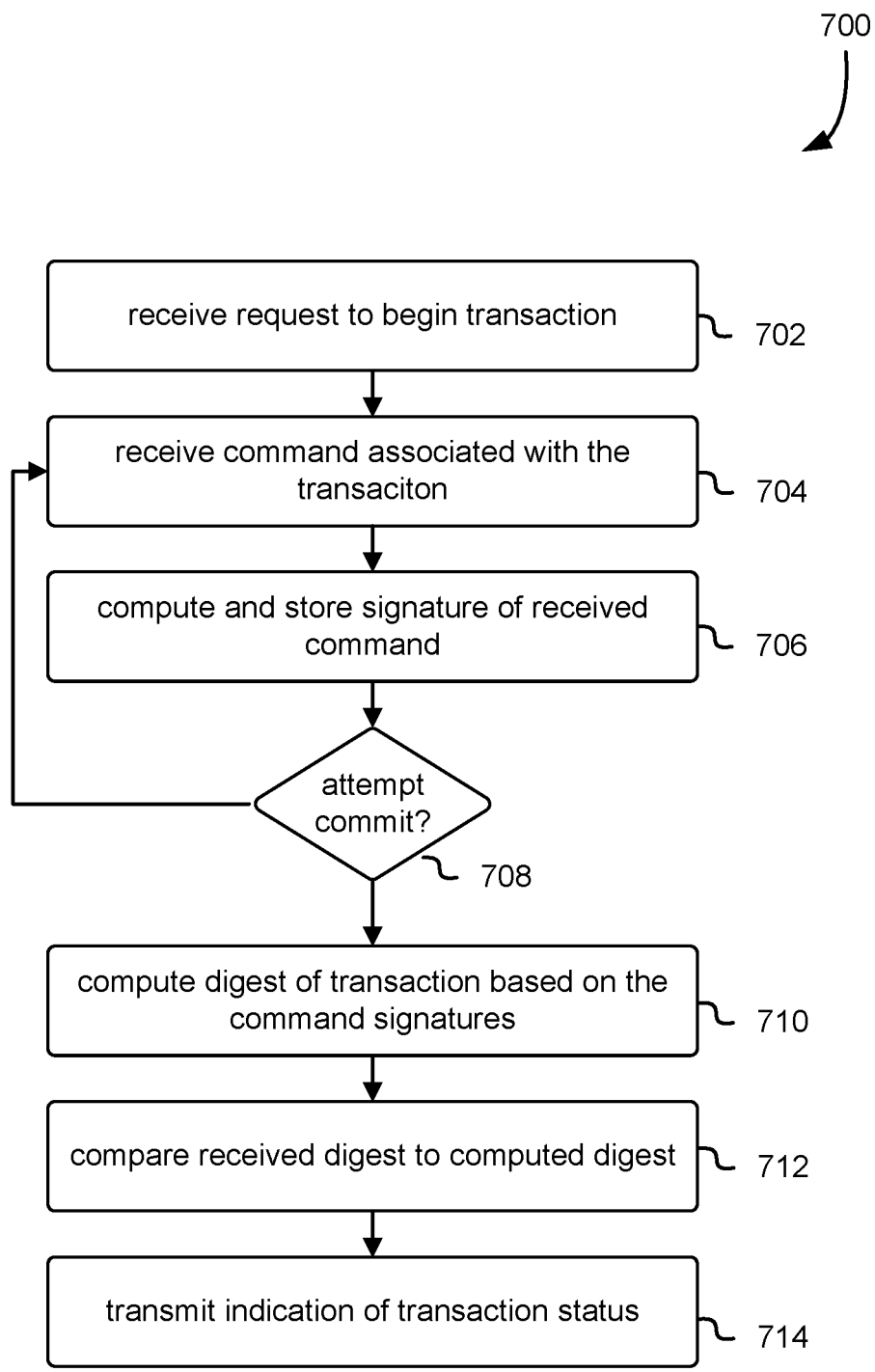
FIG. 7 illustrates an example process of server-side processing of a transaction, in accordance with at least one embodiment.

FIG. 7 illustrates an example process of server-side processing of a transaction, in accordance with at least one embodiment. The example process 700 may be performed by any suitable computing system or combination of systems, including for example the database depicted in FIG. 9.

Although FIG. 700 is depicted as a series of steps or operations, the depicted sequence should not be viewed as limiting the scope of the present disclosure to only those embodiments that conform to the depicted sequence. For example, in various embodiments, the steps or operations depicted in FIG. 7 may be altered, reordered, or omitted, except where explicitly stated or where logically required, such as when an input to one step or operation is obtained from an output of another step or operation.

At 702, the distributed database receives a request to begin a transaction. In some embodiments, a request to initiate a transaction is received by the server contemporaneously with receiving the first command of the transaction. In other embodiments, a request to initiate a transaction and the first request of the transaction are the same. In at least one embodiment, a command signature is calculated based on the data associated with the request to initiate the transaction.

At 704, the distributed database receives a command associated with the transaction. This may include query text for the command and any parameters the command might have.

At 706, the distributed database computes and stores a signature of the received command. Computation of the command signature may, for example, be performed using techniques described in relation to FIG. 4. In at least one embodiment, the command signature is calculated and stored in response to receiving the command. In at least one embodiment, the command signature is instead calculated when a request to commit the transaction is received.

At 708, the distributed database determines whether it should attempt to commit the transaction. For example, the distributed database may determine whether the client has sent a request to commit the transaction. If so, the process continues to 710. Otherwise, another command may be received at 704, and its signature computed and stored at 706.

At 710, the distributed database independently computes a digest of the command signatures. The computation is performed using a technique that is the same, in its fundamental aspects, as was used by the client to compute a corresponding digest. However, while the client's version of the digest may be said to represent the ground truth of the transaction, the distributed database's version of the digest is based on the commands, parameters, and order of the commands as perceived by the server. Deviation from the ground truth may be detected by comparing the two versions of the digest. Consequently, at 712, the distributed database compares a received digest value to the value of the digest that it computed.

At 714, the distributed database transmits an indication of the transaction's status. If the two versions of the digests match, the distributed database may commit the transaction and send a notification to the client indicating that the transaction has successfully completed. If the two versions of the digest do not match, the distributed database may roll back the transaction and send a notification to the client to indicate that the transaction has failed, and was rolled back.

Figure 8:
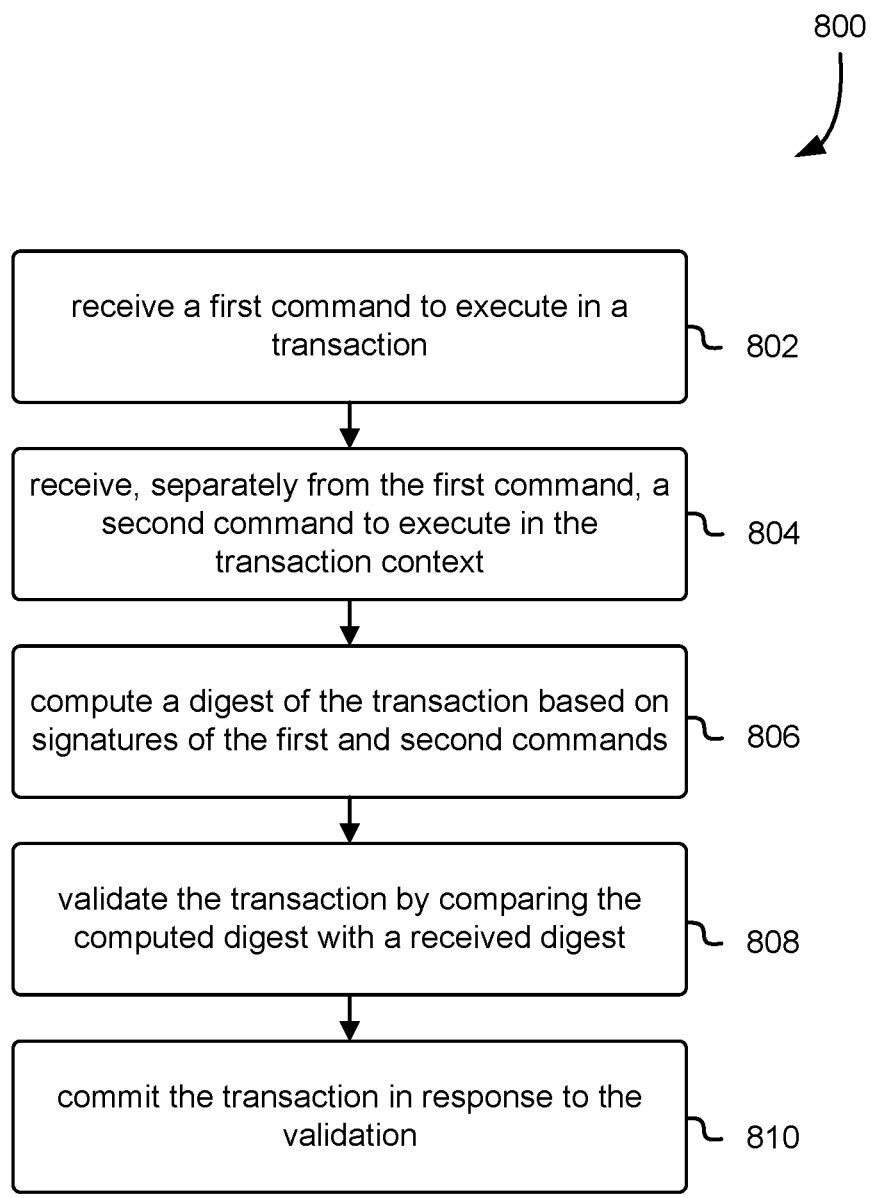
FIG. 8 illustrates an example process of operating a distributed database, in accordance with at least one embodiment.

FIG. 8 illustrates an example process of operating a distributed database, in accordance with at least one embodiment. The example process 800 may be performed by any suitable computing system or combination of systems, such as the distributed database depicted in FIG. 9.

Although FIG. 8 is depicted as a series of steps or operations, the depicted sequence should not be viewed as limiting the scope of the present disclosure to only those embodiments that conform to the depicted sequence. For example, in various embodiments, the steps or operations depicted in FIG. 8 may be altered, reordered, or omitted, except where explicitly stated or where logically required, such as when an input to one step or operation is obtained from an output of another step or operation.

At 802, the distributed database receives a first command to execute in a transaction. The command may be sent to the distributed database over a network, using the techniques discussed in relation to FIG. 1. The command may comprise query text, and may in some cases comprise parameters applicable to the query text.

The transaction may be initiated at the request of the client. Execution of the command in the transaction refers to atomic execution of the command, and all other commands executed in the same transaction context. If the transaction is committed, all commands in the transaction execute successfully. If the transaction is rolled back, none of the commands in the transaction have lasting effect.

At 804, the distributed database receives, separately from the first command, a second command to execute in the transaction. Separate receipt of the commands may include the commands arriving at different times, at different destinations within the distributed database (such as at different nodes), or via separate communications channels.

In an example, the first command is received at a first node of a distributed database, and a second command is received at a second node. The client may transmit the commands with the intention of executing the first command prior to the second command, but this intended order may not necessarily correspond to the order in which they are received by the distributed database. The distributed database might therefore perceive, and attempt to perform, the second command prior to the first command. The order perceived by the distributed database, e.g. based on the order in which the commands is received, may be described as the indicated order of commands.

At 806, the distributed database computes a digest of the transaction based on the command signatures of the first and second commands. The command signatures and digests may, for example, be calculated using the techniques described with respect to FIGS. 2 and 4.

In at least one embodiment, the digest is computed based on first and second applications of a hash operator, the first application based at least in part on the first command and the second application based at least in part on the second command.

In at least one embodiment, the first and second applications of the hash operator are in an order that corresponds to an indicated order, in the transaction, of the first and second commands.

In at least one embodiment, the second application of the hash operator is based, in part on output of the first application of the hash operator. The digest is therefore computed based on successive, or iterative, applications of the hash operator in a defined order. For the client, this is the intended order of execution, whereas for the server, this is the indicated order.

At 808, the distributed database validates the transaction by comparing the computed digest with a received digest. Validation of the transaction indicates that all commands of the transaction has been received and that an indicated order of the commands is equivalent to an intended order of the commands.

At 810, the distributed database commits the transaction in response to the successful validation of the transaction. Should the validation fail, the transaction is rolled back rather than committed.

In an example embodiment, a computer-implemented method of validating a distributed transaction comprises receiving first and second commands to execute in a transaction; computing a digest of the transaction based at least in part on a first signature of the first command and a second signature of the second command; validating the transaction by at least comparing the computed digest with a received digest; and committing the transaction.

The example embodiment of a computer-implemented method may further comprise computing the digest based at least in part on first and second applications of a hash operator, the first application based at least in part on the first command and the second application based at least in part on the second command.

The example embodiment of a computer-implemented method may further comprise the second application of the hash operator being based at least in part on output of the first application of the hash operator.

The example embodiment of a computer-implemented method may further comprise the digest being computed based at least in part on an indicated order of commands in the transaction.

The example embodiment of a computer-implemented method may further comprise the order being indicated by an order in which the first and second commands were received.

The example embodiment of a computer-implemented method may further comprise the received digest being computed based at least in part on an intended order of commands in the transaction.

The example embodiment of a computer-implemented method may further comprise receiving the first command at a first node of a distributed database; and receiving the second command at another node of the distributed database.

The example embodiment of a computer-implemented method may further comprise the received digest being computed by a client based at least in part on an intended order of executing commands in the transaction.

The example embodiment of a computer-implemented method may further comprise validation of the transaction indicating that all commands of the transaction has been received and that an indicated order of the commands is equivalent to an intended order.

In an example embodiment of a computer program product, a non-transitory computer-readable storage medium having stored thereon executable instructions that, in response to being executed by one or more processors of a computing device, cause the computing device to at least send a first command to execute in a transaction to a distribute database; send, separately from the first command, a second command to execute in the transaction; compute a digest of the transaction based at least in part on a first signature of the first command and a second signature of the second command; send, to the distributed database, the digest and a request to commit the transaction; and receive, from the distributed database, a confirmation that the transaction has been committed, the confirmation based at least in part on a digest value computed independently by the distributed database matches the digest sent to the distributed database.

The example embodiment of a computer program product may also comprise the non-transitory computer-readable storage medium having stored thereon further executable instructions that, in response to being executed by one or more processors, cause the computing device to at least compute at least one of the first command signature or the second command signature based at least in part on a parameter of the command.

The example embodiment of a computer program product may also comprise the digest being based at least in part on a randomized seed value.

The example embodiment of a computer program product may also comprise the non-transitory computer-readable storage medium having stored thereon further executable instructions that, in response to being executed by one or more processors, cause the computing device to at least compute the digest based at least in part on first and second applications of a hash operator, the first application based at least in part on the first command and the second application based at least in part on the second command.

The example embodiment of a computer program product may also comprise the second application of the hash operator being based at least in part on output of the first application of the hash operator.

The example embodiment of a computer program product may also comprise the digest being computed based at least in part on an intended order of commands in the transaction.

Figure 9:
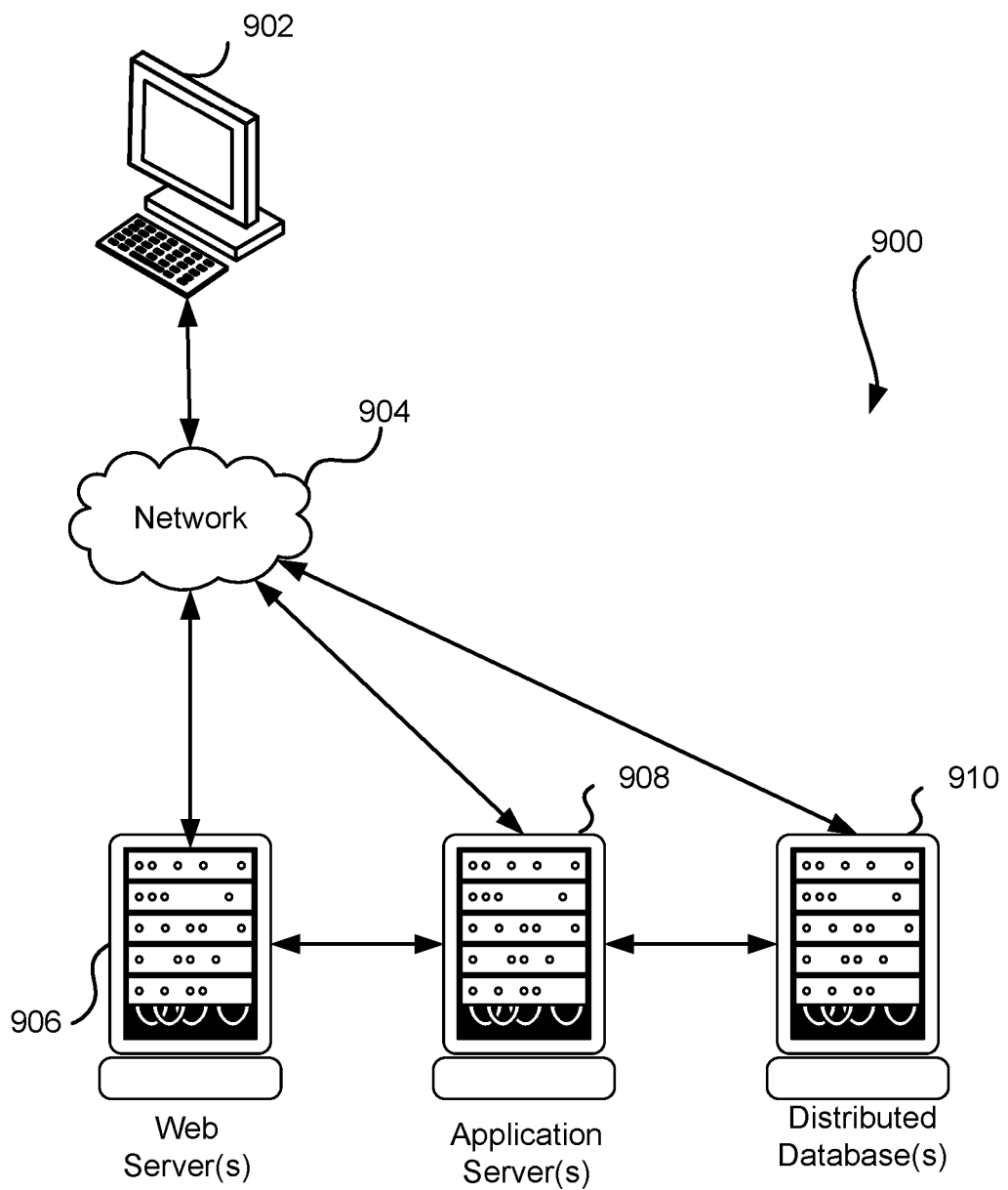
FIG. 9 illustrates an example of a system in which various embodiments can be implemented.

FIG. 9 illustrates aspects of an example system 900 for implementing aspects in accordance with an embodiment. As will be appreciated, although a web-based system is used for purposes of explanation, different systems may be used, as appropriate, to implement various embodiments. In an embodiment, the system includes an electronic client device 902, which includes any appropriate device operable to send and/or receive requests, messages, or information over an appropriate network 904 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 906 for receiving requests and serving content in response thereto, although for other networks an alternative device serving a similar purpose could be used as would be apparent to one of ordinary skill in the art.

In an embodiment, the illustrative system includes at least one application server 908 and at least one distributed database 910, and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 902 and the application server 908, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The distributed database 910, in an embodiment, may include several separate data tables, databases, data documents, dynamic data storage schemes and/or other data storage mechanisms and media for storing data relating to a particular aspect of the present disclosure. The distributed database 910, in an embodiment, is operable, through logic associated therewith, to receive instructions from the application server 908 and obtain, update or otherwise process data in response thereto, and the application server 908 provides static, dynamic, or a combination of static and dynamic data in response to the received instructions.

In an embodiment, the distributed database 910 operates according to the techniques described herein, such as those techniques described in relation to FIGS. 1-8. The distributed database 910 may, for example, correspond to the distributed database 100 depicted in FIG. 1.

In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 902. Continuing with this example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 900 and/or another system, such as for launching, terminating, deleting, modifying, reading, and/or otherwise accessing such computing resources.

In an embodiment, one or more of the user device 902, web server 906, or application server 908 transmits, to the distributed database 910, requests to perform commands in the context of a transaction. The user device 902, web server 906, or application server 908 may, in these cases, operate according to the techniques described herein. For example, the user device 902, web server 906, or application server 908 may operate similarly to the client 102 depicted in FIG. 1, and may compute transaction digest values in a manner similar to what is described in relation to FIG. 6.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 900, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization, and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above that can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the subject matter set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the subject matter recited by the claims to the specific form or forms disclosed but, on the contrary, the intention is to cover all modifications, alternative constructions, and equivalents falling within the spirit and scope of this disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors — for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate various embodiments and does not pose a limitation on the scope of the claims unless otherwise claimed. No language in the specification should be construed as indicating any non-claimed element as essential to the practice of inventive subject material disclosed herein.

Embodiments of this disclosure are described herein, including the best mode known to the inventors for carrying out inventive concepts described herein. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A system, comprising:
   at least one processor; and
   a memory comprising executable instructions that, in response to execution by the at least one processor, cause the system to at least:
   receive a plurality of commands in a first order, the plurality of commands to be executed during a transaction and having been transmitted in a second order;
   compute a digest of the transaction based at least in part on signatures of the plurality of commands and the first order;
   in response to a request to commit the transaction comprising a received digest that indicates the second order, validate the transaction based at least in part on comparing the computed digest with the received digest; and
   commit the transaction in response to validation of the transaction.

2. The system of claim 1, wherein the computed digest is computed based at least in part on first and second applications of a hash operator, the first application based at least in part on a first command of the plurality of commands and the second application based at least in part on a second command of the plurality of commands.

3. The system of claim 2, wherein the first and second applications of the hash operator are in accordance with the first order.

4. The system of claim 2, wherein the second application of the hash operator is based at least in part on output of the first application of the hash operator.

5. The system of claim 1, wherein the validation of the transaction indicates that all commands of the transaction have been received and that the first order is equivalent to the second order.

6. A computer-implemented method, comprising:
   receiving first and second commands to execute in a database transaction;
   computing a digest of the database transaction based at least in part on the first command, the second command, and an indicated order that indicates an order in which the first and second commands were at least one of received or performed;

in response to receiving instructions to commit the database transaction, validating the database transaction by at least comparing the computed digest with a received digest indicating an intended order that indicates an order in which the first and second commands were intended to be performed, wherein validation of the database transaction indicates that all commands of the database transaction have been received and that the indicated order is equivalent to the intended order, wherein the instructions to commit the database transaction include the received digest; and committing the database transaction.

7. The method of claim 6, further comprising:

computing the computed digest based at least in part on first and second applications of a hash operator, the first application based at least in part on the first command and the second application based at least in part on the second command.

8. The method of claim 7, wherein the second application of the hash operator is based at least in part on output of the first application of the hash operator.

9. The method of claim 6, wherein the intended order corresponds to an order in which all of the commands in the database transaction were sent by a client.

10. The method of claim 6, wherein the intended order indicates an order in which all of the commands in the database transaction were intended to be performed.

11. The method of claim 10, wherein the received digest is computed based at least in part on the intended order.

12. The method of claim 11, wherein the intended order corresponds to an order in which all of the commands in the database transaction were sent by a client.

13. The method of claim 6, further comprising:

receiving the first command at a first node of a distributed database; and receiving the second command at a different second node of the distributed database.

14. The method of claim 13, wherein the first and second nodes of the distributed database perform the first and second commands in the order the first and second commands are received.

15. A non-transitory computer-readable storage medium having stored thereon executable instructions that, in response to being executed by one or more processors of a computing device, cause the computing device to at least:

receive at least a portion of a plurality of commands to execute in a database transaction, an indicated order indicating at least one of an order in which commands of the portion were received or an order in which the commands of the portion were executed;

compute a digest of the database transaction based at least in part on the portion and the indicated order;

validate the database transaction by at least comparing the computed digest with a received digest, wherein validation of the database transaction indicates that the portion includes all of the plurality of commands and that the indicated order is equivalent to an intended order that indicates an order in which the plurality of commands were intended to be performed, wherein the validation of the database transaction is based at least in part on received instructions to commit the database transaction, wherein the received instructions include the received digest; and commit the database transaction.

16. The non-transitory computer-readable storage medium of claim 15, having stored thereon further executable instructions that, in response to being executed by the one or more processors, cause the computing device to at least:

compute a signature of a first command of the portion based at least in part on a parameter of the first command.

17. The non-transitory computer-readable storage medium of claim 15, wherein the computed digest is based at least in part on a randomized seed value.

18. The non-transitory computer-readable storage medium of claim 15, having stored thereon further executable instructions that, in response to being executed by the one or more processors, cause the computing device to at least:

compute the computed digest based at least in part on first and second applications of a hash operator, the first application based at least in part on a first command of the portion and the second application based at least in part on a second command of the portion.

19. The non-transitory computer-readable storage medium of claim 18, wherein the second application of the hash operator is based at least in part on output of the first application of the hash operator.

20. The non-transitory computer-readable storage medium of claim 15, wherein the received digest is computed based at least in part on an order in which the plurality of commands were transmitted by a client.

* * * * *